Sept. 15, 1931.   L. S. BUSHNELL   1,823,188
METHOD FOR TREATING DISCOLORED SULPHUR
Filed Sept. 3, 1929
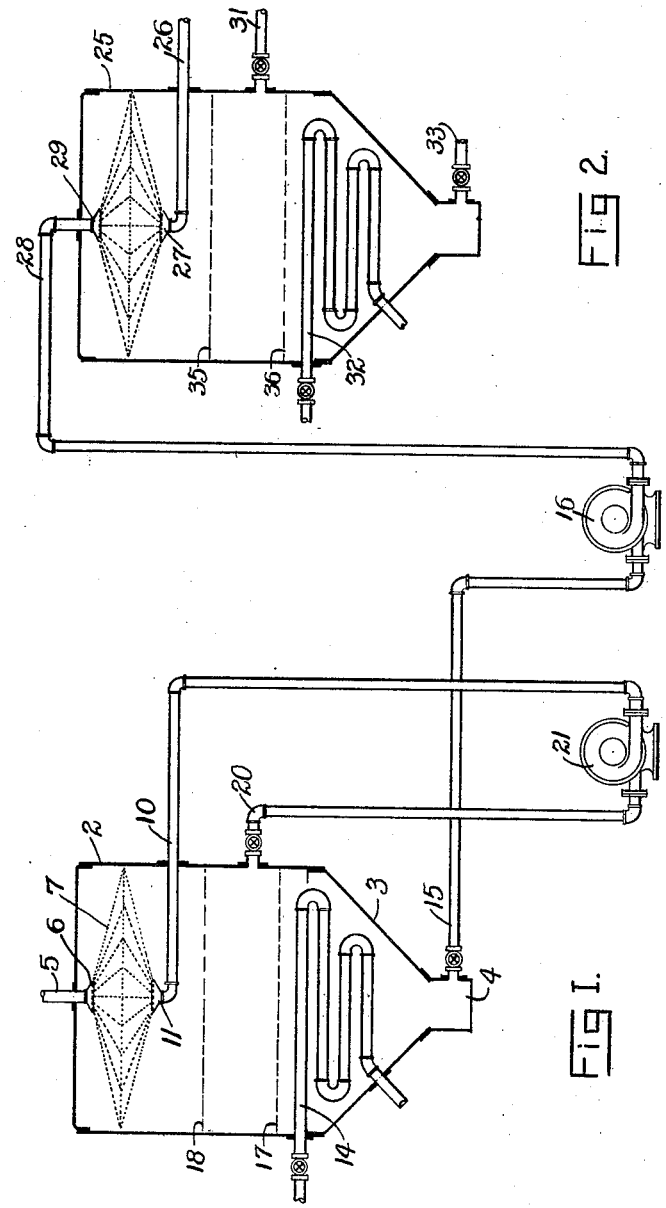
INVENTOR.
LYMAN S BUSHNELL.
BY Jesse R. Stone
ATTORNEY.

Patented Sept. 15, 1931

1,823,188

UNITED STATES PATENT OFFICE

LYMAN S. BUSHNELL, OF FREEPORT, TEXAS, ASSIGNOR TO THE FREEPORT SULPHUR COMPANY, OF FREEPORT, TEXAS

METHOD FOR TREATING DISCOLORED SULPHUR

Application filed September 3, 1929. Serial No. 390,199.

Various methods, treatments and processes have been resorted to in attempts to remove the discoloring substances from the sulphur and to restore its original lustre and brilliancy after it has been over-heated or contaminated with oil. Some of these processes include the treatment of the sulphur with various materials such as carbon and filtering it through mediums such as sand. These treatments, however, have not been proven successful from a commercial standpoint due to the fact that the lustre of the sulphur is not always wholly restored and the fact that the filtration step of the process is very slow. It has been found that the sulphur must be filtered through a very fine medium in order to remove the oil and other contaminating substances. The filtering process heretofore employed is believed to have been largely that of absorption or adsorption and the filtering medium has soon become ineffective so that no commercially successful treatment of the sulphur has been evolved. In the present application, however, a different theory has been followed and a substantial improvement in the color of the sulphur as well as the rate of filtering the sulphur has been developed.

It is one of the objects of the present invention to devise a method of treating the sulphur with certain chemical re-agents or oxidizing agents so that the discoloration is almost entirely removed and the brilliant original color restored.

Another object of the invention is to spray the molten sulphur in the presence of a mist of sulphuric acid and other chemicals so that each particle of the sulphur comes in contact with the treating acid and substantially all of the discoloring material is subjected to a chemical reaction.

The invention relates particularly to an improved method and apparatus for treating discolored sulphur.

Sulphur deposits occur in the United States and particularly along the Gulf Coast States in Louisiana and Texas. These sulphur deposits occur in a porous lime or gypsum formation where the sulphur is deposited in cavities of dome-like structure. The process used in removing this sulphur is somewhat similar to the well known Frasch method which consists of drilling a well and circulating through the sulphur bearing formation fluids heated above the fusion point of sulphur. In this manner the sulphur is reduced to a molten state and may be withdrawn by an air lift or other fluid lifting device. Sulphur melts at a temperature of about 240° F. and remains in a fluid but more or less viscous state above that temperature. It is therefore desirable to handle the sulphur while it is in this state. There is, however, the detrimental feature that if the sulphur is maintained in a heated condition for a prolonged period that it becomes discolored. The sulphur also occurs in a discolored state in some formations due to the presence of contaminating substances such as petroleum, bitumen or other carbonaceous material. These are generally known as "oil" and serve to discolor the sulphur and reduce its commercial appearance and advantages.

It is still another object of the invention to devise a simple and economical apparatus for treating the sulphur so that it may be sprayed with the acid and washed to remove the acid and discoloration from the sulphur.

It is also one of the objects of the invention to add various oxidizing agents to the spraying solution such as sodium nitrate, potassium nitrate and potassium chlorate.

Another object of the invention is to arrange an apparatus where the sulphur may be treated under pressure with super-heated water, so that the sulphur may be washed free of acid and at least partially so of impurities while in a molten condition.

Other and further objects of the invention will be readily apparent when the following description is considered in connection with the accompanying drawings wherein Fig. 1 is a side elevation of a spray tank for treating the sulphur with acid. Fig. 2 is a tank somewhat similar to Fig. 1 but arranged to withstand pressure necessary to prevent the vaporization of super-heated water at the temperature of molten sulphur.

The invention will be best understood by having reference to Fig. 1 where a spray tank is indicated generally at 2. This tank may take any desired form but is here shown as having a cone bottom 3 and a collector pit 4. Adjacent the top of the tank has been shown an inlet 5. This inlet is provided with a suitable spraying nozzle 6 so that the sulphur will be distributed through the area of the tank as shown by the dotted lines at 7. Spaced below the top of the tank is shown the acid inlet 10. This inlet is provided with a nozzle 11 which is similar to the nozzle 6 except that the spray is directed upwardly and adapted to come in contact with the spray from the nozzle 6 as shown by the dotted lines.

It is contemplated that if the sulphur is being treated in molten condition that the acid also be heated to a temperature at least equal to that of the molten sulphur so that there will be no chilling effect when the acid and sulphur come in contact. It is intended that the sulphur be divided into minute particles by the spray so that each particle may come in contact with the spray or mist of the acid. The lower portion of the spray tank 2 is shown as provided with a heating coil 14 so that the sulphur as it sinks to the bottom of the tank may be maintained in a molten condition. This coil may be heated by steam or super-heated water or in any manner desired. The outlet from the spray tank is shown at 15 and is connected with a pump shown diagrammatically at 16. The acid flowing in through the nozzle 11 is preferably of a solution having a specific gravity slightly less than that of molten sulphur so that as the acid and sulphur settle downwardly from the sprays they will assume the position as shown by the dotted lines, the sulphur occupying the space below the dotted line 17 and the acid the area between 17 and 18. This is a very desirable arrangement in that all of the sulphur must pass through a predetermined amount of acid before it finally settles to the lower portion of the tank and in event some of the sulphur particles have not come in contact with the acid spray they will receive the proper treatment in passing through the upper level of the acid between 17 and 18 in the tank. An outlet 20 connected with a circulating pump 21 has been shown so that the acid may be passed through the nozzle 11 in a continuous stream. It is obvious that the acid may be withdrawn and fresh acid submitted as desired. Also settling basins or cleaners of any type may be inserted in the acid circulating system.

After the sulphur has been withdrawn by the pump 16 from the outlet 15 at the base of the spray tank 2 it may be passed through a washing process, a filtering process or both depending upon the condition of the sulphur and the amount of discoloration which it is desired to remove. In order that the sulphur may be washed and the acid and other discoloring substances removed I have shown a wash tank 25. This tank is preferably constructed to withstand a pressure which will prevent vaporization of water at 320° F. which is approximately 90 lbs. per square inch. This pressure is desired so that superheated water may be pumped into the tank through the inlet 26 and the spray nozzle 27. This nozzle is similar to the nozzle 11 in the spray tank. The inlet 28 for the sulphur is also provided with a nozzle 29 which is similar to the nozzle 6 in the spray tank. It will be seen from this arrangement that the sulphur is finely divided for a second time and is washed with the heated water so that the acid and discoloring materials are removed. The outlet 31 is similar to the outlet 20 and the coil 32 is used to maintain the sulphur in a heated condition in the base of the tank. The outlet 33 may lead to a sulphur bin or to any other source of storage or molds so that the sulphur may be permitted to harden. The dotted lines 35 and 36 indicate the water and sulphur levels respectively. This arrangement provides that the sulphur passing from the spray will fall by gravity through the strata of heated water and be subjected to cleansing action in addition to the spray from the nozzle 27.

The structure which I have described above is intended as a diagrammatic showing only and various alterations may be made without departing from the spirit of the invention.

I have found that by treating the sulphur in accordance with the method and apparatus here disclosed that the oil and other particles which discolor the sulphur are charred or oxidized by contact with the acids and are changed in form and chemical composition so that they no longer intimately cling to the particles of sulphur and cause discoloration after the sulphur has been washed.

The idea of using sulphuric acid to treat the sulphur is covered in my co-pending application filed of even date herewith but in the treatment of the sulphur in this application it is contemplated that various percentages of an oxidizing agent such as sodium nitrate, potassium nitrate or potassium chlorate be used with the sulphuric acid. In this manner I have found that the original color and lustre of the sulphur is restored and the contaminating substances have been practically eliminated. In this treatment with the use of the sulphuric acid in combination with the other chemicals also restores the original color of the over heated or contaminated sulphur so that a quick and economical process has been evolved. I contemplate the use of the spray tank 2 and the washing tank 25 without the aid of a filtration process so that the sulphur may be sprayed with acid and washed with water and the slow filtering step entirely eliminated. However, I do not desire to be limited to this precise method as, if advisable in order to restore the color of the sulphur, I may employ the filtration step by passing the treated sulphur through any suitable filtering medium. The apparatus for the filtering step has not been shown in the drawings as it may embody any conventional type of filter and as such are well known it is not thought that further illustration is necessary.

Having described my invention, what I desire to secure by Letters Patent is:

1. A method of treating discolored sulphur including bringing into contact the discolored sulphur and an acid solution of an oxidizing agent composed of sodium nitrate, potassium nitrate, potassium chlorate and sulphuric acid.

2. A method of treating discolored sulphur including bringing into contact the discolored sulphur and an acid solution composed of potassium nitrate, potassium chlorate and sulphuric acid.

3. A method of treating discolored sulphur including bringing into contact the discolored sulphur and an acid solution composed of potassium chlorate and sulphuric acid.

4. A method of treating discolored sulphur including bringing into contact the discolored sulphur and an acid solution composed of sodium nitrate, potassium chlorate and sulphuric acid.

5. A method of treating discolored sulphur including bringing into contact the discolored sulphur and an acid solution composed of sodium nitrate and sulphuric acid.

6. A method of treating discolored sulphur including bringing into contact the discolored sulphur and an acid solution composed of sodium nitrate, potassium nitrate and sulphuric acid.

7. A method of treating discolored sulphur including bringing into contact the discolored sulphur and an acid solution composed of potassium nitrate and sulphuric acid.

8. A method of restoring sulphur to its original color including intimately mixing the sulphur with an acid solution of sulphuric acid and sodium nitrate, passing the sulphur thru a body of the acid solution, and finally washing the treated sulphur to remove the acid.

9. A method of treating discolored sulphur comprising spraying the sulphur in molten condition into a container filled with a spray or mist of a solution of sulphuric acid and a bleaching agent, passing the sulphur through a body of the solution, and washing the treated sulphur to remove the solution.

10. A method of treating discolored sulphur including spraying the sulphur in an atmosphere of an acid solution of sulphuric acid and a bleaching agent, the specific gravity of the solution being different from that of the sulphur, and washing the sulphur to remove the acid.

11. A method of treating discolored sulphur including spraying the sulphur in an atmosphere of an acid solution of sulphuric acid and an oxidizing agent, the specific gravity of the solution being different from that of the sulphur, and washing the sulphur to remove the acid.

12. A method of treating discolored sulphur including bringing into contact the discolored sulphur and an oxidizing agent composed of sodium nitrate, potassium nitrate, potassium chlorate and sulphuric acid.

13. A method of treating discolored sulphur including heating said sulphur to a molten condition and spraying it into intimate contact with a liquid oxidizing agent.

In testimony whereof I hereunto affix my signature this 15th day of August, A. D. 1929.

LYMAN S. BUSHNELL.